United States Patent
Kishi

(10) Patent No.: US 10,766,206 B2
(45) Date of Patent: Sep. 8, 2020

(54) MANUFACTURING METHOD OF RESIN COMPOSITE PLATE

(71) Applicant: FANUC CORPORATION, Yamanashi (JP)

(72) Inventor: Hajimu Kishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/021,035

(22) Filed: Jun. 28, 2018

(65) Prior Publication Data

US 2019/0001529 A1 Jan. 3, 2019

(30) Foreign Application Priority Data

Jun. 29, 2017 (JP) .................... 2017-126857

(51) Int. Cl.
| | |
|---|---|
| *B29C 43/20* | (2006.01) |
| *B29B 11/16* | (2006.01) |
| *B29C 65/00* | (2006.01) |
| *B29C 70/20* | (2006.01) |
| *B29C 70/46* | (2006.01) |

(Continued)

(52) U.S. Cl.
CPC .......... *B29C 66/1142* (2013.01); *B29B 11/16* (2013.01); *B29C 43/003* (2013.01); *B29C 43/18* (2013.01); *B29C 43/203* (2013.01); *B29C 66/12842* (2013.01); *B29C 66/14* (2013.01); *B29C 66/22* (2013.01); *B29C 66/23* (2013.01);

(Continued)

(58) Field of Classification Search
CPC ............. B29C 66/114; B29C 66/1142; B29C 66/1224; B29C 66/12241; B29C 66/1284; B29C 66/12841; B29C 66/12842; B29C 2043/189; B29C 66/118; B29C 66/1182; B29C 66/14; B29C 66/22; B29C 66/221; B29C 66/223; B29C 66/225; B29C 66/227; B29C 66/2272; B29C 66/2274; B29C 66/2276; B29C 66/229; B29C 66/23; B29C 66/234; B29C 43/203; B29C 43/206; B29C 70/42; B29C 70/46; B29C 70/462;

(Continued)

(56) References Cited

U.S. PATENT DOCUMENTS 5,474,635 A * 12/1995 Jacob .................. B29C 37/0082
156/163
5,601,676 A * 2/1997 Zimmerman ....... B29C 66/1142
156/304.3

(Continued)

FOREIGN PATENT DOCUMENTS

DE 10153875 A1 5/2003
JP 2013-221114 A 10/2013
(Continued)

*Primary Examiner* — Atul P. Khare
(74) *Attorney, Agent, or Firm* — Hauptman Ham, LLP

(57) ABSTRACT

In a manufacturing method of a resin composite plate for manufacturing a resin composite plate by heating under pressure a resin sheet group having a plurality of fiber-reinforced thermoplastic resin sheets stacked together, and thereby integrating the resin sheet group into one resin composite plate, the fiber-reinforced thermoplastic resin sheets each containing fibers arranged in one direction, the resin composite plate having a desired thickness is manufactured by stacking the plurality of fiber-reinforced thermoplastic resin sheets having different thickness.

13 Claims, 10 Drawing Sheets

(51) Int. Cl.
*B29C 43/00* (2006.01)
*B29C 70/42* (2006.01)
*B29C 43/18* (2006.01)
*C08J 5/04* (2006.01)
*B29K 105/06* (2006.01)
*B29K 101/12* (2006.01)
*B29C 43/02* (2006.01)

(52) U.S. Cl.
CPC .......... *B29C 70/202* (2013.01); *B29C 70/207* (2013.01); *B29C 70/42* (2013.01); *B29C 70/46* (2013.01); *C08J 5/04* (2013.01); *B29C 43/02* (2013.01); *B29C 2043/189* (2013.01); *B29K 2101/12* (2013.01); *B29K 2105/06* (2013.01)

(58) Field of Classification Search
CPC ............ B29C 43/146; B29C 2043/147; B29C 2043/148; B29B 11/12
See application file for complete search history.

(56) References Cited

U.S. PATENT DOCUMENTS

| | | | |
|---|---|---|---|
| 7,243,055 B2 * | 7/2007 | Chen | B29C 70/30 345/420 |
| 7,731,817 B2 * | 6/2010 | Hethcock | B29C 53/40 156/258 |
| 8,540,909 B2 * | 9/2013 | Dan-Jumbo | B29C 73/10 264/36.1 |
| 9,381,728 B2 * | 7/2016 | Hanks | B29C 70/222 |
| 9,764,499 B2 * | 9/2017 | Jones | B29C 70/30 |
| 9,919,473 B2 * | 3/2018 | Fujii | B29C 65/02 |
| 2009/0126060 A1 * | 5/2009 | Jacobs | B29C 70/20 2/2.5 |
| 2016/0167762 A1 * | 6/2016 | Jones | B29C 70/30 428/58 |
| 2017/0057195 A1 * | 3/2017 | Blom | B32B 3/10 |
| 2017/0057666 A1 | 3/2017 | Blom et al. | |
| 2019/0210295 A1 * | 7/2019 | Arcidiacono | B29C 65/08 |

FOREIGN PATENT DOCUMENTS

| | | | |
|---|---|---|---|
| JP | 2013221114 A | * | 10/2013 |
| JP | 2014-148111 A | | 8/2014 |
| JP | 2014-198838 A | | 10/2014 |
| JP | 2016-172346 A | | 9/2016 |
| JP | 2016-180037 A | | 10/2016 |
| JP | 2017-1371 A | | 1/2017 |
| WO | 2017/073555 A1 | | 5/2017 |

* cited by examiner

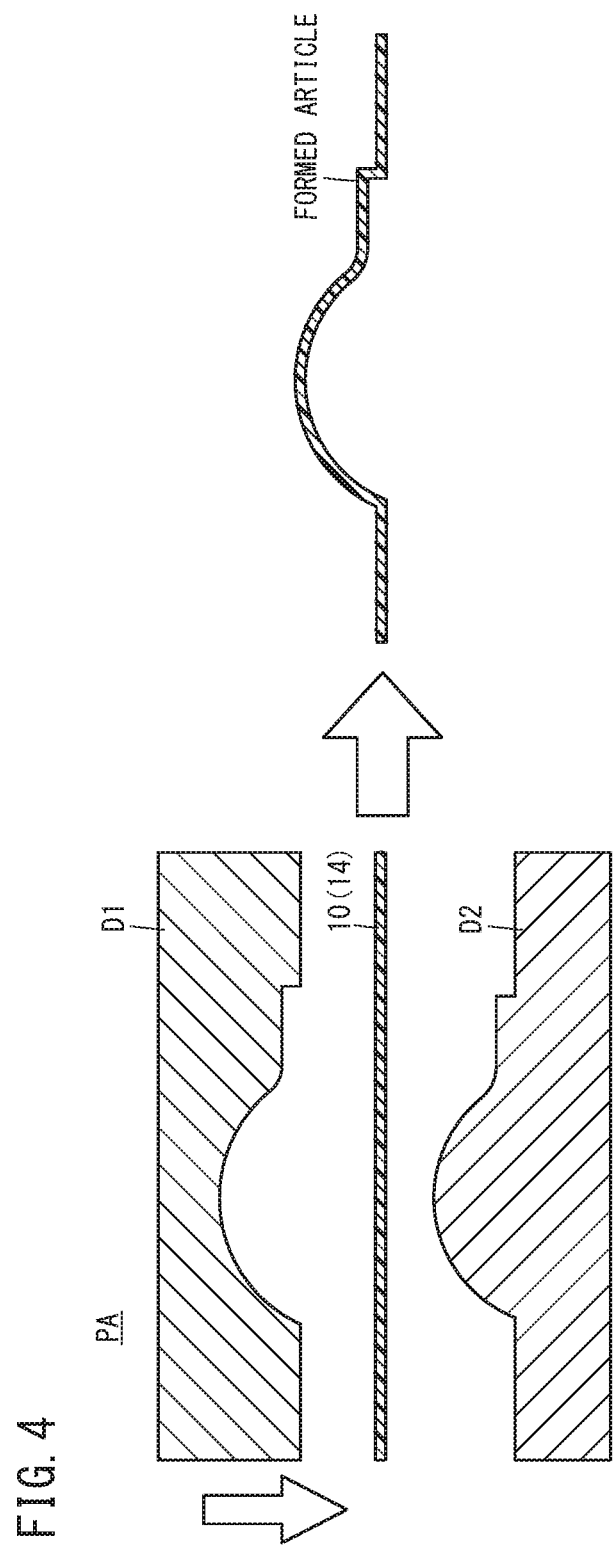

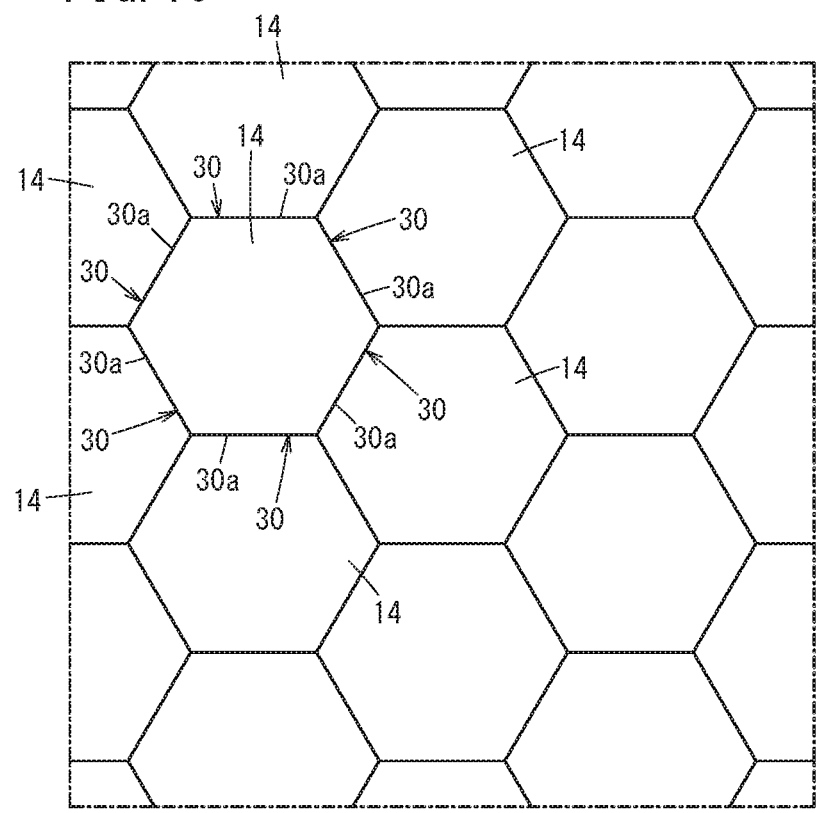

MANUFACTURING METHOD OF RESIN COMPOSITE PLATE

CROSS-REFERENCE TO RELATED APPLICATION

This application is based upon and claims the benefit of priority from Japanese Patent Application No. 2017-126857 filed on Jun. 29, 2017, the contents of which are incorporated herein by reference.

BACKGROUND OF THE INVENTION

Field of the Invention

The present invention relates to a manufacturing method of a resin composite plate for manufacturing one resin composite plate by heating under pressure a resin sheet group containing a plurality of fiber-reinforced thermoplastic resin sheets stacked together and thereby integrating the resin sheets.

Description of the Related Art

In Japanese Laid-Open Patent Publication No. 2013-221114, a technology is disclosed for manufacturing a resin sheet by stacking plural pieces of carbon fiber composite resin materials each having a unit thickness.

SUMMARY OF THE INVENTION

By reducing the unit thickness of the carbon fiber composite resin materials, it is possible to finely adjust the thickness of the resin sheet. Therefore, it is possible to obtain the resin sheet having a desired thickness. However, a problem arises in that the manufacturing cost rises because the number of pieces of carbon fiber composite resin materials to be stacked increases and accordingly the number of processes for stacking the carbon fiber composite resin materials increases.

On the other hand, by thickening the unit thickness of carbon fiber composite resin materials to be used, it is possible to decrease the number of pieces of the carbon fiber composite resin materials to be used. However, another problem arises in that it is impossible to finely adjust the thickness of the resin sheet.

The present invention has been made in order to solve the aforementioned problems, and it is an object of the present invention to provide a manufacturing method of a resin composite plate capable of decreasing the number of fiber-reinforced thermoplastic resin sheets to be stacked, and at the same time, of finely adjusting the thickness of the rein composite plate.

According to a first aspect of the present invention, there is provided a manufacturing method of a resin composite plate for manufacturing a resin composite plate by heating under pressure a resin sheet group having a plurality of fiber-reinforced thermoplastic resin sheets stacked together, and thereby integrating the resin sheet group into one resin composite plate, the fiber-reinforced thermoplastic resin sheets each containing fibers arranged in one direction, the manufacturing method including manufacturing the resin composite plate having a desired thickness by stacking the plurality of fiber-reinforced thermoplastic resin sheets having different thickness.

According to a second aspect of the present invention, there is provided a manufacturing method of a resin composite plate for manufacturing a resin composite plate by heating under pressure a resin sheet group having a plurality of fiber-reinforced thermoplastic resin sheets stacked together, and thereby integrating the resin sheet group into one resin composite plate, the fiber-reinforced thermoplastic resin sheets each containing fibers arranged in one direction, wherein at least one of the plurality of stacked fiber-reinforced thermoplastic resin sheets differs in volume fraction of fiber from others of the stacked fiber-reinforced thermoplastic resin sheets.

According to a third aspect of the present invention, there is provided a manufacturing method of a resin composite plate for manufacturing a resin composite plate by heating under pressure a plurality of fiber-reinforced thermoplastic resin sheets that are laid on a plane, and thereby integrating the fiber-reinforced thermoplastic resin sheets into one resin composite plate, the fiber-reinforced thermoplastic resin sheets each containing fibers arranged in one direction, wherein a joint surface between the adjacent fiber-reinforced thermoplastic resin sheets is in the form of a curved surface, plural planes, or a combination of a curved surface and a plane.

According to the first aspect, the number of fiber-reinforced thermoplastic resin sheets to be used can be decreased in comparison with a case that one resin composite plate is manufactured by stacking a plurality of fiber-reinforced thermoplastic resin sheets having the same thickness. Accordingly, it is possible to decrease the number of processes for stacking the fiber-reinforced thermoplastic resin sheets, and hence to reduce the manufacturing cost. Furthermore, it is possible to finely adjust the thickness of the resin composite plate by stacking the plurality of fiber-reinforced thermoplastic resin sheets having different thickness, and hence to easily manufacture the rein composite plate having a desired thickness.

According to the second aspect, of the plurality of the stacked fiber-reinforced thermoplastic resin sheets, some fiber-reinforced thermoplastic resin sheets that require strength can be increased in strength, while the other fiber-reinforced thermoplastic resin sheets which relatively do not require strength can be weakened in strength. Consequently, the manufacturing cost can be reduced.

According to the third invention, in comparison with a case that the joint surface is in the form of one plane, it is possible to enlarge the area of the joint surface, and hence it is possible to prevent the resin composite plate from breaking at the joint surface between the fiber-reinforced thermoplastic resin sheets.

The above and other objects, features, and advantages of the present invention will become more apparent from the following description when taken in conjunction with the accompanying drawings, in which preferred embodiments of the present invention are shown by way of illustrative examples.

BRIEF DESCRIPTION OF THE DRAWINGS

FIG. 4 is a schematic view for explaining a press forming by a press apparatus;

FIG. 10 is a schematic view for explaining the manufacturing method of the resin composite plate according to the second modification and showing an example in which each of resin sheet groups has a regular hexagon.

DESCRIPTION OF THE PREFERRED EMBODIMENTS

Hereinafter, a preferred embodiment and modifications of a manufacturing method of a resin composite plate according to the present invention will be described in detail with reference to the accompanying drawings.

In a manufacturing method of a resin composite plate 10 according to the present embodiment, one resin composite plate 10 is manufactured by stacking a plurality of fiber-reinforced thermoplastic resin sheets 12 and then heating under pressure a resin sheet group 14 having the plurality of fiber-reinforced thermoplastic resin sheets 12 stacked together to thereby integrate the plural resin sheets 12 of the resin sheet group 14.

Figure 1A:
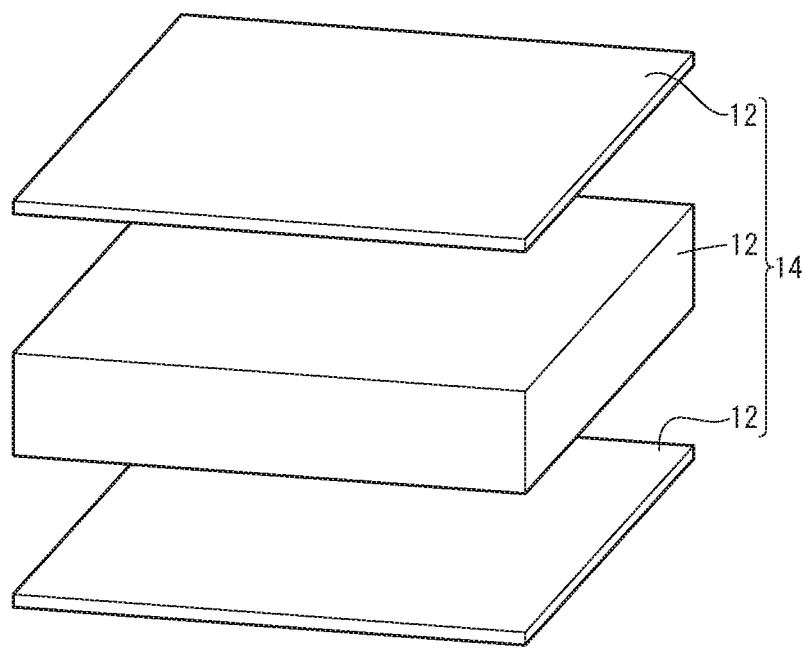
FIG. 1A is a schematic view for explaining a manufacturing method of a resin composite plate according to an embodiment of the present invention and showing a state that a plurality of fiber-reinforced thermoplastic resin sheets are stacked.
Figure 1B:
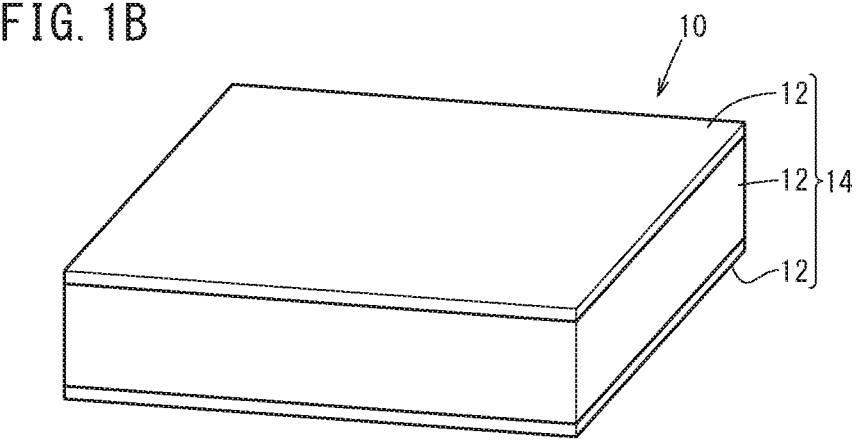
FIG. 1B is a schematic view for explaining the manufacturing method of the resin composite plate according to the embodiment and showing one resin composite plate manufactured by heating under pressure a resin sheet group having the plurality of fiber-reinforced thermoplastic resin sheets stacked together.

FIG. 1A and FIG. 1B are schematic views for explaining the manufacturing method of the resin composite plate 10. FIG. 1A shows a state that the plurality of fiber-reinforced thermoplastic resin sheets 12 are stacked. FIG. 1B shows one resin composite plate 10 manufactured by heating under pressure the resin sheet group 14 having the plurality of fiber-reinforced thermoplastic resin sheets 12 stacked together.

Each of the fiber-reinforced thermoplastic resin sheets 12 is a sheet made of thermoplastic resin containing fibers F (for example, fibers such as carbon fibers, glass fibers or the like). The fibers F of the fiber-reinforced thermoplastic resin sheet 12 are arranged in one direction (refer to FIG. 2 and FIG. 3).

The resin sheet group 14 is heated under pressure by use of an upper die and a lower die (not shown). Further, the manufactured resin composite plate 10 is press-formed into a formed article by a press apparatus PA having dies (upper die D1 and lower die D2) (refer to FIG. 4). That is, the upper die D1 and the lower die D2 sandwich or clamp the resin composite plate 10 therebetween and press the resin composite plate 10, to thereby form a formed article of a three-dimensional shape. Incidentally, manufacturing of the resin composite plate 10 by heating the resin sheet group 14 under pressure and manufacturing of the formed article by press-forming may be carried out by a single press apparatus PA. For example, the resin sheet group 14 may be heated under pressure and press-formed at the same time.

In the manufacturing method according to the present embodiment, the resin composite plate 10 having a desired thickness is manufactured by heating under pressure the resin sheet group 14 containing the plurality of fiber-reinforced thermoplastic resin sheets 12 having different thickness which are stacked together.

FIG. 1A and FIG. 1B show an example in which three fiber-reinforced thermoplastic resin sheets 12 are stacked, in order to facilitate understanding of the description. In FIG. 1A and FIG. 1B, the fiber-reinforced thermoplastic resin sheets 12 of the top layer and the bottom layer have the same thickness (for example, 0.05 mm), while the fiber-reinforced thermoplastic resin sheet 12 of the intermediate layer (middle layer) has the largest thickness (for example, 0.5 mm). Incidentally, the fiber-reinforced thermoplastic resin sheets 12 of the top layer and the bottom layer may have different thickness.

In this manner, since the resin composite plate 10 is manufactured by stacking the plurality of fiber-reinforced thermoplastic resin sheets 12 having different thickness, the number of the fiber-reinforced thermoplastic resin sheets 12 to be used can be decreased in comparison with a case that the resin composite plate 10 is manufactured by stacking a plurality of fiber-reinforced thermoplastic resin sheets 12 having the same thickness. Accordingly, the number of processes for stacking the fiber-reinforced thermoplastic resin sheets 12 is decreased, and hence the manufacturing cost can be reduced. Furthermore, the thickness of the resin composite plate 10 can be finely adjusted as a result of stacking the plurality of fiber-reinforced thermoplastic resin sheets 12 having different thickness, and thus it is possible to easily manufacture the resin composite plate 10 having a desired thickness.

According to the prior art method, for example, in a case where a resin composite plate 10 having a thickness of 0.6 mm is manufactured by use of a plurality of fiber-reinforced thermoplastic resin sheets 12 each having a thickness of 0.1 mm, it is necessary to stack six sheets of the fiber-reinforced thermoplastic resin sheets 12. Consequently, in adjusting the thickness of the resin composite plate 10, the adjustment only can be done in units of 0.1 mm. On the other hand, in order to prioritize the fine adjustment of the fiber-reinforced thermoplastic resin sheets 12, in a case where the resin composite plate 10 having a thickness of 0.6 mm is manufactured by use of the fiber-reinforced thermoplastic resin sheets 12 each having a thickness of 0.05 mm, the fine adjustment of thickness of the resin composite plate 10 can be performed in units of 0.05 mm. However, it is necessary to stack as many as twelve sheets of the fiber-reinforced thermoplastic resin sheets 12.

Figure 2:
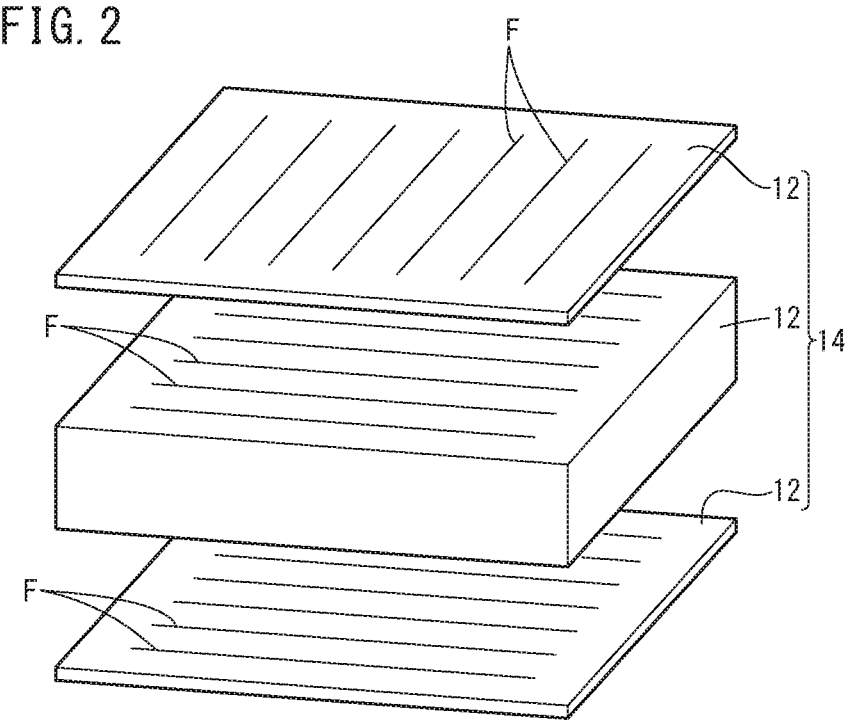
FIG. 2 is a schematic view showing an example in which fiber directions in the resin composite plate intersect with each other in the manufacturing method of the resin composite plate according to the embodiment.

Furthermore, in the manufacturing method of the present embodiment, the resin composite plate 10 of a desired thickness may be manufactured by stacking the plurality of fiber-reinforced thermoplastic resin sheets 12 having different thickness such that the fiber directions (the directions of fibers F) of the resin sheet group 14 cross each other (preferably, perpendicularly) as shown in FIG. 2. Consequently, it is possible to reduce the directional dependency in strength of the resin composite plate 10, and hence the resin composite plate 10 has an improved strength.

Figure 3:
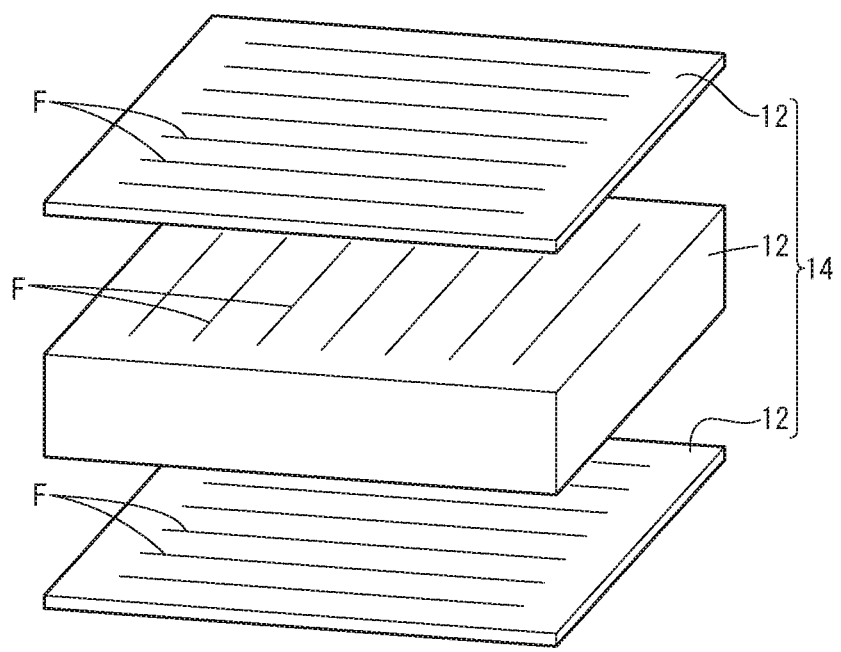
FIG. 3 is a schematic view showing an example in which fiber directions of two adjacently-stacked fiber-reinforced thermoplastic resin sheets intersect with each other in the manufacturing method of the resin composite plate according to the embodiment.

Further, the resin composite plate 10 of a desired thickness may be manufactured by stacking the plurality of fiber-reinforced thermoplastic resin sheets 12 having different thickness such that the directions of the fibers F of two adjacently-stacked fiber-reinforced thermoplastic resin sheets 12 cross each other, as shown in FIG. 3. Consequently, it is possible to eliminate the directional dependency in strength of the resin composite plate 10, and hence the strength of the resin composite plate 10 is further improved.

As the volume fraction of fiber (Vf) becomes higher, the fiber-reinforced thermoplastic resin sheets 12 increase in strength, but increase in cost. To suppress such an increase in cost, at least one of the plurality of stacked fiber-reinforced thermoplastic resin sheets 12 of the resin sheet group 14 may differ in volume fraction of fiber from others of the fiber-reinforced thermoplastic resin sheets 12. For example, the volume fraction of fiber of the fiber-reinforced thermoplastic resin sheet 12 of the intermediate layer may be made to be larger than the volume fraction of fiber of the fiber-reinforced thermoplastic resin sheets 12 of the top layer and the bottom layer. With this structure, of the plurality of stacked fiber-reinforced thermoplastic resin sheets 12, some fiber-reinforced thermoplastic resin sheets 12 requiring strength can be increased in strength, while other fiber-reinforced thermoplastic resin sheets 12 that relatively do not require strength can be weakened in strength. Consequently, the manufacturing cost can be reduced.

[Modifications]

The above-described embodiment may be modified as follows.

<First Modification>

Figure 5A:
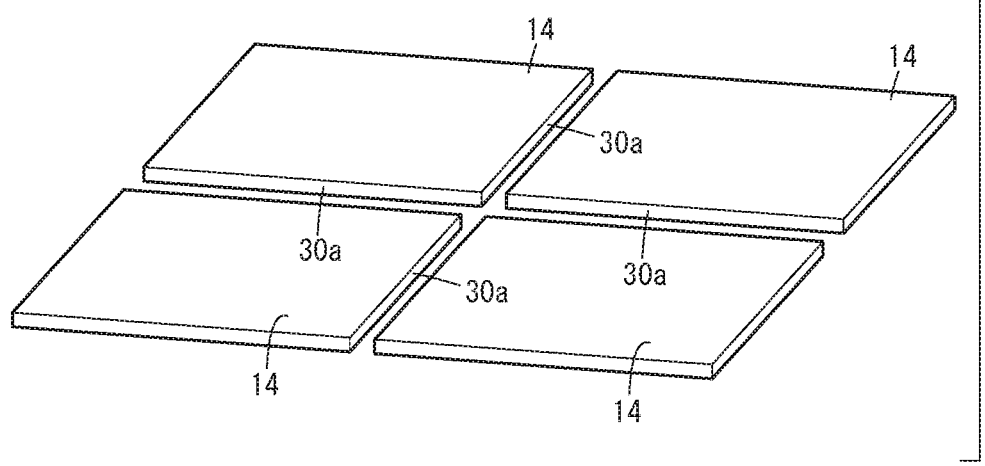
FIG. 5A is a schematic view for explaining a manufacturing method of a resin composite plate according to a first modification and showing a state that a plurality of resin sheet groups are laid on a plane.
Figure 5B:
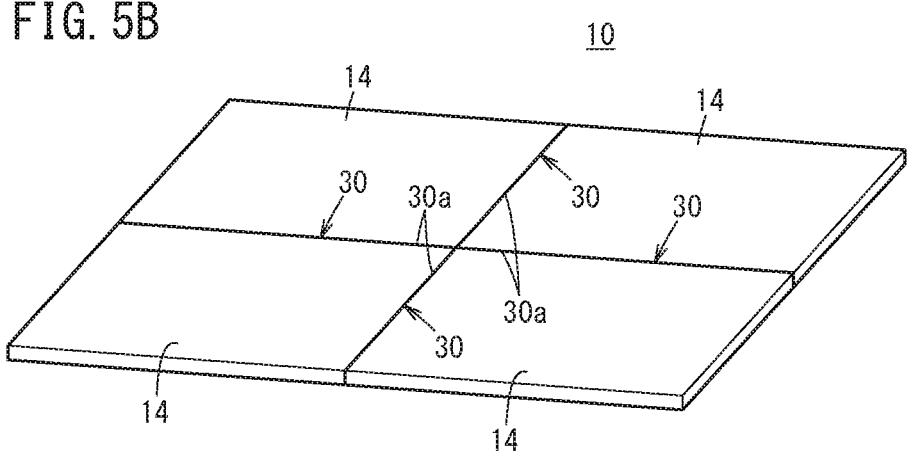
FIG. 5B is a schematic view for explaining the manufacturing method of the resin composite plate according to the first modification and showing one resin composite plate manufactured by heating under pressure the plurality of resin sheet groups laid on the plane.

FIG. 5A and FIG. 5B are schematic views for explaining a manufacturing method of the resin composite plate 10 according to a first modification. FIG. 5A shows a state that a plurality of resin sheet groups 14 are laid on a plane. FIG. 5B shows one resin composite plate 10 manufactured by heating under pressure the plurality of resin sheet groups 14 laid on the plane. Although being arranged at predetermined intervals in FIG. 5A, the plurality of resin sheet groups 14 are actually arranged on the plane without any space therebetween. Incidentally, the same components as those in the aforementioned embodiment will be given the same reference numerals, and description will be made only regarding components differing from those in the aforementioned embodiment.

Incidentally, reference numeral 30 denotes joint portions between the resin sheet groups 14 (the fiber-reinforced thermoplastic resin sheets 12) which are laid on the plane. Reference numeral 30a denotes joint surfaces (joined surfaces of the joint portions).

In the manufacture method of the resin composite plate 10 in the first modification, one resin composite plate 10 is manufactured by tightly laying or arranging the plurality of resin sheet groups 14 on the plane without any space therebetween (refer to FIG. 5A), and then heating under pressure the plurality of resin sheet groups 14 tightly laid on the plane to thereby integrate the resin sheet groups 14 into the one resin composite plate (refer to FIG. 5B). Consequently, it is possible to easily manufacture the resin composite plate 10 suitable for the size and shape of a formed article to be formed by pressing.

As the thickness and the fiber content (the content of fiber F) of the entire resin sheet group 14 become larger, the resin sheet group 14 increases in strength but increases in cost. To suppress such an increase in cost, at least one of the plurality of resin sheet groups 14 laid on the plane may differ in at least one of the thickness and the content of fiber F from others of the resin sheet groups 14. By partly changing the thickness or the content of fiber F of the resin sheet groups 14 as above, it is possible to increase the strength of the resin sheet group 14 requiring strength and to decrease the strength of the resin sheet group 14 that does not require strength. Consequently, the manufacturing cost can be reduced.

In this case, at least one of the thickness and the content of fiber F of the resin sheet groups 14 may be changed in dependence on a portion of a formed article to be press-formed from the resin composite plate 10. Thus, of the formed article obtained by press-forming, a portion requiring strength can be increased in strength, while a portion which does not require strength can be weakened in strength. Accordingly, the manufacturing cost can be reduced. Further, it is possible to easily manufacture the resin composite plate 10 suitable for a formed article to be obtained by press-forming.

Figure 6A:
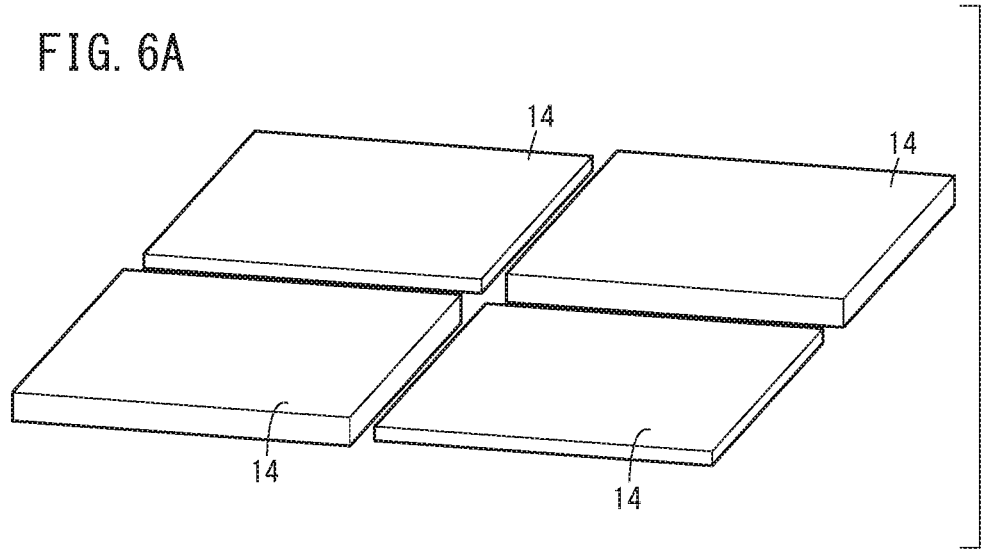
FIG. 6A is a schematic view showing a state that a plurality of resin sheet groups having different thickness are laid on a plane in the manufacturing method of the resin composite plate according to the first modification.
Figure 6B:
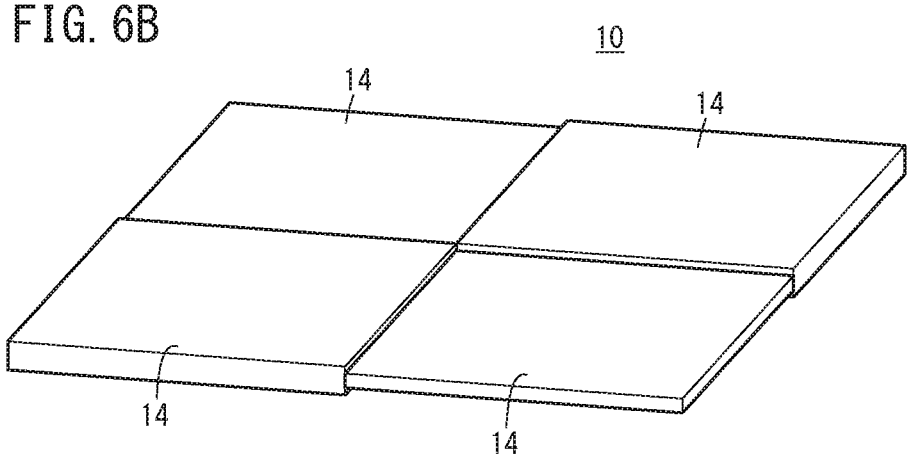
FIG. 6B is a schematic view showing one resin composite plate manufactured by heating under pressure the plurality of resin sheet groups having different thickness that are laid on the plane in the manufacturing method of the resin composite plate according to the first modification.

Incidentally, FIG. 6A is a schematic view showing a state that a plurality of resin sheet groups 14 having different thickness are laid on a plane, and FIG. 6B is a schematic view showing one resin composite plate 10 manufactured by heating under pressure the plurality of resin sheet groups 14 having different thickness, which are laid on the plane. Although being arranged at predetermined intervals in FIG. 6A, the plurality of resin sheet groups 14 are actually laid or arranged on the plate without any space therebetween.

Further, in the manufacturing method of the first modification, at least one of the plurality of resin sheet groups 14 laid on the plane may differ from the other resin sheet groups 14 in the number of the stacked fiber-reinforced thermoplastic resin sheets 12, the thickness, the content of fiber (F) or the volume fraction of fiber. By partly changing the thickness, the content of fiber F, the volume fraction of fiber, or the number of the fiber-reinforced thermoplastic resin sheets 12 constituting the resin sheet group 14, it is possible to increase the strength of some of the resin sheet groups 14 requiring strength and to weaken the strength of the other of the resin sheet groups 14 that do not require strength. Accordingly, the manufacturing cost can be reduced.

In this case, the thickness, the content of fiber F, the volume fraction of fiber, or the number of the fiber-reinforced thermoplastic resin sheets 12 of the resin sheet group 14 may be changed in dependence on a portion of a formed article to be press-formed from the resin composite plate 10.

Figure 7:
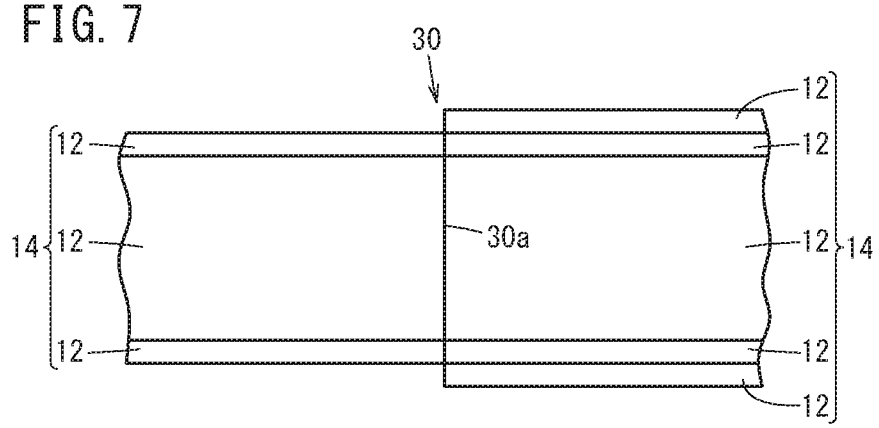
FIG. 7 is a schematic view showing an example in which the numbers of fiber-reinforced thermoplastic resin sheets in the resin sheet groups are different from each other in the manufacturing method of the resin composite plate according to the first modification.

Incidentally, FIG. 7 is a schematic view showing an example in which the numbers of the fiber-reinforced thermoplastic resin sheets 12 of the resin sheet groups 14 are different from each other. As shown in FIG. 7, the number of the fiber-reinforced thermoplastic resin sheets 12 of one of the resin sheet groups 14 is three whereas the number of the fiber-reinforced thermoplastic resin sheets 12 of the other resin sheet group 14 is five.

Causing the thickness, the content of fiber F, or the volume fraction of fiber, of the fiber-reinforced thermoplastic resin sheets 12 of one resin sheet group 14 to be different from that of another resin sheet group 14 means that the thickness, the content of fiber F, or the volume fraction of fiber, of at least one of the plurality of fiber-reinforced thermoplastic resin sheets 12 of the one resin sheet group 14 differs from the thickness, the content of fiber F, or the volume fraction of fiber, of each of the plurality of fiber-reinforced thermoplastic resin sheets 12 of the other resin sheet group 14. For example, a case is included where the three fiber-reinforced thermoplastic resin sheets 12 constituting one resin sheet group 14 have respective thicknesses of 0.05 mm, 0.06 mm and 0.5 mm, while the three fiber-reinforced thermoplastic resin sheets 12 constituting another resin sheet group 14 have respective thicknesses of 0.05 mm (two sheets) and 0.5 mm (one sheet).

<Second Modification>

In the aforementioned first modification, the rectangular resin sheet groups 14 (each including the fiber-reinforced thermoplastic resin sheets 12) are laid on the plane. In this structure, the joint surfaces 30a between the resin sheet groups 14 are each in the form of one plane (one flat or straight surface), and the plurality of joint surfaces 30a adjoin each other and are linearly arranged (refer to FIG. 5A and FIG. 5B). Thus, the resin composite plate 10 easily breaks at the joint portions 30 between the resin sheet groups 14.

To deal with the above, in a second modification, the joint surfaces 30a between the adjacently-arranged resin sheet groups 14 are in the form of a curved surface, plural planes or a combination of a curved surface and planes.

Figure 8:
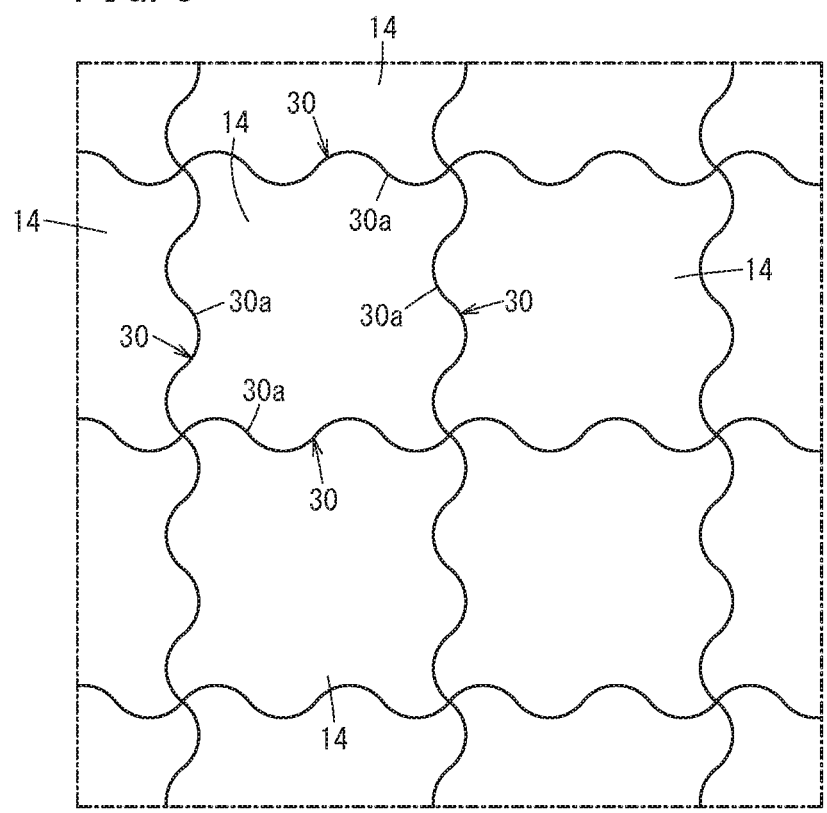
FIG. 8 is a schematic view for explaining a manufacturing method of a resin composite plate according to a second modification and showing an example in which joint surfaces between resin sheet groups are in the form of curved lines.
Figure 9:
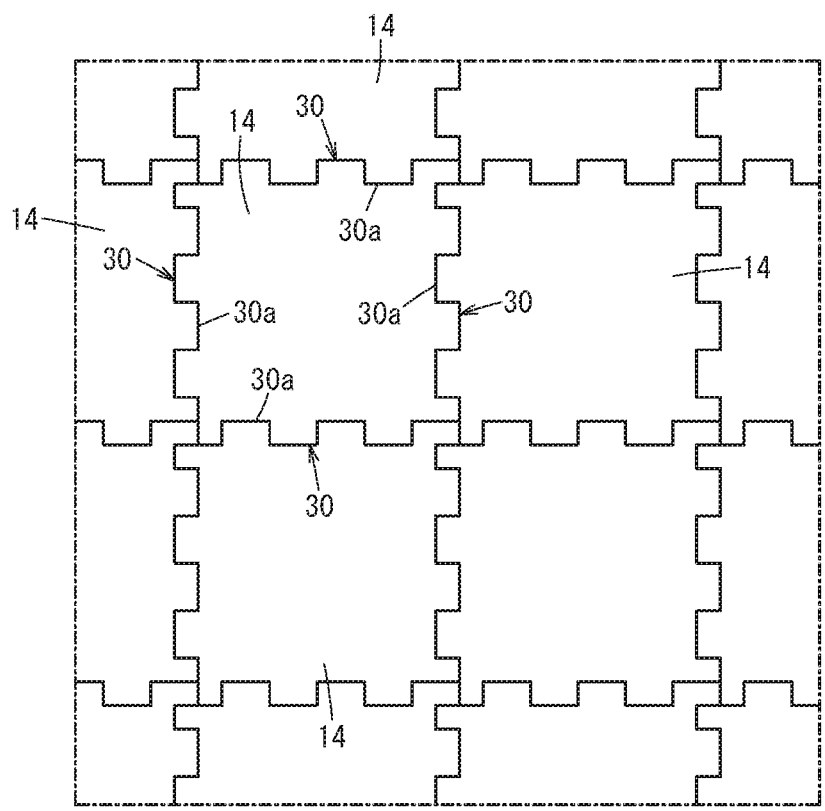
FIG. 9 is a schematic view for explaining the manufacturing method of the resin composite plate according to the second modification and showing an example in which joint surfaces between resin sheet groups are in the form of a plurality of straight lines.

FIG. 8 shows an example in which the joint surfaces 30a between the resin sheet groups 14 are each in the form of a curved line. FIG. 9 shows another example in which the joint surfaces 30a between the resin sheet groups 14 are each in the form of a plurality of straight lines.

With this structure, it is possible to enlarge the area of the joint surface 30a in comparison with the case that the joint surface 30a is in the form of one plane, and hence it is possible to prevent the resin composite plate 10 from breaking at the joint portions 30 between the resin sheet groups 14.

Incidentally, the resin sheet groups 14 may also have a polygonal shape. FIG. 10 is a schematic view showing an example in which the resin sheet groups 14 are each formed in a regular hexagonal shape. In the example shown in FIG. 10, although each of the joint surfaces 30a between the resin sheet groups 14 is in the form of one plane, a plurality of joint surfaces 30a are arranged in different directions without being linearly arranged adjoiningly to each other. Thus, it is possible to prevent the resin composite plate 10 from breaking at the joint portions 30 between the resin sheet groups 14. By forming the resin sheet groups 14 in the polygonal shape as the above, it is possible to prevent breaking of the resin composite plate 10 at the joint portions 30 between the resin sheet groups 14, which would otherwise be caused by loads exerted in various directions. Further, it is possible to decrease the amount of material and the weight while keeping the strength.

<Third Modification>

In a case where at least one of the plurality of fiber-reinforced thermoplastic resin sheets 12 constituting a resin sheet group 14 is made to differ in the volume fraction of fiber from the others of the fiber-reinforced thermoplastic resin sheets 12 (which is one aspect described in the aforementioned embodiment), the plurality of fiber-reinforced thermoplastic resin sheets 12 of the resin sheet group 14 may have the same thickness. Even in this case, some of the fiber-reinforced thermoplastic resin sheets 12 requiring strength can be increased in strength, while the other of the fiber-reinforced thermoplastic resin sheets 12 which relatively do not require strength can be weakened in strength, and hence the manufacturing cost can be reduced.

<Fourth Modification>

In a case where one piece of resin composite plate 10 is manufactured with a plurality of resin sheet groups 14 being arranged on a plane and where the joint surfaces 30a between the adjacently-arranged resin sheet groups 14 are in the form of a curved surface, plural planes or a combination of curved surfaces and planes (which is one aspect described in the second modification), the plurality of fiber-reinforced thermoplastic resin sheets 12 constituting the resin sheet groups 14 may have the same thickness. Further, also in a case where the resin sheet groups 14 are each formed in a polygonal shape, the plurality of fiber-reinforced thermoplastic resin sheets 12 constituting the resin sheet groups 14 may have the same thickness. Even in these cases, it is possible to enlarge the area of the joint surfaces 30a and thus it is possible to prevent the resin composite plate 10 from breaking at the joint portions 30 between the resin sheet groups 14.

Further, one resin composite plate 10 may be manufactured by laying a plurality of fiber-reinforced thermoplastic resin sheets 12 on a plane and then heating under pressure the plurality of fiber-reinforced thermoplastic resin sheets 12. In this case, joint surfaces 30a between the adjacently-laid fiber-reinforced thermoplastic resin sheets 12 may be in the form of a curved surface, plural planes or a combination of curved surfaces and planes. Further, the fiber-reinforced thermoplastic resin sheets 12 may each be formed in a polygonal shape (for example, regular hexagon). Even in this case, it is possible to enlarge the area of the joint surface 30a, and hence it is possible to prevent the resin composite plate 10 from breaking at the joint portions 30 between the fiber-reinforced thermoplastic resin sheets 12.

<Fifth Modification>

In a fifth modification, a three-dimensional formed article may be formed by stacking a plurality of manufactured resin composite plates 10 and then heating under pressure the plurality of stacked resin composite plates 10 with the plates 10 being sandwiched or clamped between dies (the upper die D1 and the lower die D2) of the press apparatus PA shown in FIG. 4.

<Sixth Modification>

There may be provided an aspect in which the above first to fifth modifications are combined arbitrarily.

[Technical Concepts Obtained from Embodiments]

Hereinafter, description will be made regarding the technical concepts that can be grasped from the above embodiment and the first to sixth modifications.

<First Technical Concept>

In a manufacturing method of a resin composite plate (10) for manufacturing a resin composite plate (10) by heating under pressure a resin sheet group (14) having a plurality of fiber-reinforced thermoplastic resin sheets (12) stacked together, and thereby integrating the resin sheet group into one resin composite plate, the fiber-reinforced thermoplastic resin sheets each containing fibers (F) arranged in one direction, the resin composite plate (10) having a desired thickness is manufactured by stacking the plurality of fiber-reinforced thermoplastic resin sheets (12) having different thickness.

With this configuration, the number of the fiber-reinforced thermoplastic resin sheets (12) to be used can be decreased in comparison with a case that one resin composite plate (10) is manufactured by stacking a plurality of fiber-reinforced thermoplastic resin sheets (12) having the same thickness. Accordingly, the number of processes for stacking the fiber-reinforced thermoplastic resin sheets (12) is decreased, and hence it is possible to reduce the manufacturing cost. Furthermore, the thickness of the resin composite plate (10) can be finely adjusted as a result of stacking the plurality of fiber-reinforced thermoplastic resin sheets (12) having different thickness, and hence it is possible to easily manufacture the resin composite plate (10) having a desired thickness.

The resin composite plate (10) having a desired thickness may be manufactured by stacking the plurality of fiber-reinforced thermoplastic resin sheets (12) having different thickness so as to cross fiber directions of the fiber-reinforced thermoplastic resin sheets. Consequently, it is possible to reduce the directional dependency in the strength of the resin composite plate (10), and hence the strength of the resin composite plate (10) is improved.

The resin composite plate (10) having a desired thickness may be manufactured by stacking the plurality of fiber-reinforced thermoplastic resin sheets (12) having different thickness so as to cross the fiber directions of two adjacently-stacked fiber-reinforced thermoplastic resin sheets (12). Consequently, it is possible to eliminate the directional dependency in the strength of the resin composite plate (10), and hence the strength of the resin composite plate (10) is further improved.

At least one of the plurality of stacked fiber-reinforced thermoplastic resin sheets (12) may differ in volume fraction of fiber from others of the stacked fiber-reinforced thermoplastic resin sheets (12). With this configuration, of the plurality of stacked fiber-reinforced thermoplastic resin sheets (12), some fiber-reinforced thermoplastic resin sheets (12) that require strength can be increased in strength, while the other fiber-reinforced thermoplastic resin sheets (12) that relatively do not require strength can be weakened in strength. Consequently, the manufacturing cost can be reduced.

The resin composite plate (10) may be manufactured by heating under pressure a plurality of resin sheet groups (14) that are laid on a plane, and thereby integrating the resin sheet groups into one resin composite plate, the resin sheet groups each having the plurality of fiber-reinforced thermoplastic resin sheets (12) stacked together, the fiber-reinforced thermoplastic resin sheets having different thickness. Consequently, it is possible to easily manufacture a resin composite plate (10) suitable for the size and shape of a formed article to be obtained by press-forming.

At least one of the plurality of resin sheet groups (14) laid on the plane may differ from others of the resin sheet groups (14) in at least one of thickness and content of fiber (F). By partly changing the thickness or the content of fiber (F) of the resin sheet groups (14) as above, it is possible to increase the strength of a resin sheet group (14) requiring strength and to weaken the strength of another resin sheet group (14) that does not require strength. Accordingly, the manufacturing cost can be reduced.

At least one of the thickness and the content of fiber (F) of the resin sheet groups (14) may be changed depending on a portion of a formed article to be formed from the resin composite plate (10). Thus, of a formed article to be formed by pressing, a portion requiring strength can be increased in strength, while another portion which does not require strength can be weakened in strength. Accordingly, the manufacturing cost can be reduced. Further, it is possible to easily manufacture the resin composite plate (10) suitable for a formed article to be formed by pressing.

At least one of the plurality of resin sheet groups (14) laid on the plane may differ from others of the resin sheet groups (14) in the number of the stacked fiber-reinforced thermoplastic resin sheets (12), the thickness, the content of fiber (F), or the volume fraction of fiber. Thus, by partly changing the number of fiber-reinforced thermoplastic resin sheets (12) constituting the resin sheet groups (14), thickness, content of fiber (F), or volume fraction of fiber, it is possible to increase the strength of a resin sheet group (14) requiring strength and to weaken the strength of another resin sheet group (14) that does not require strength. Accordingly, the manufacturing cost can be reduced.

The number of the fiber-reinforced thermoplastic resin sheets (12) of the resin sheet groups (14), the thickness, the content of fiber (F), or the volume fraction of fiber may be changed depending on a portion of a formed article to be formed from the resin composite plate (10). Thus, of the formed article to be formed by pressing, a portion requiring strength can be increased in strength, while a portion which does not require strength can be weakened in strength. Accordingly, the manufacturing cost can be reduced. Further, it is possible to easily manufacture the resin composite plate (10) suitable for a formed article to be formed by pressing.

A joint surface (30a) between the adjacent resin sheet groups (14) may be in the form of a curved surface, plural planes, or a combination of a curved surface and a plane. With this structure, it is possible to enlarge the area of the joint surface (30a) in comparison with a case that the joint surface (30a) is in the form of one plane, and hence it is possible to prevent the resin composite plate (10) from breaking at the joint portion (30) between the resin sheet groups (14).

The resin sheet groups (14) may each have a polygonal shape. With this structure, it is possible to prevent breaking of the resin composite plate (10) at the joint portion (30) between the resin sheet groups (14), against load exerted in various directions. Further, it is possible to decrease the amount of material and the weight while keeping the strength.

Incidentally, a three-dimensional formed article may be manufactured by heating under pressure one or plural manufactured resin composite plates (10), with the one or plural resin composite plates (10) being sandwiched or clamped between the dies.

<Second Technical Concept>

In a manufacturing method of a resin composite plate (10) for manufacturing a resin composite plate (10) by heating under pressure a resin sheet group (14) having a plurality of fiber-reinforced thermoplastic resin sheets (12) stacked together, and thereby integrating the resin sheet group into one resin composite plate, the fiber-reinforced thermoplastic resin sheets each containing fibers (F) arranged in one direction, at least one of the plurality of stacked fiber-reinforced thermoplastic resin sheets (12) differs in volume fraction of fiber from others of the stacked fiber-reinforced thermoplastic resin sheets (12).

With this configuration, of the plurality of stacked fiber-reinforced thermoplastic resin sheets (12), some fiber-reinforced thermoplastic resin sheets (12) that require strength can be increased in strength, while the other fiber-reinforced thermoplastic resin sheets (12) that relatively do not require strength can be weakened in strength. Consequently, the manufacturing cost can be reduced.

Incidentally, a formed article of a three-dimensional shape may be manufactured by heating under pressure one or plural manufactured resin composite plates (10), with the one or plural resin composite plates (10) being sandwiched or clamped between the dies.

<Third Technical Concept>

In a manufacturing method of a resin composite plate (10) for manufacturing a resin composite plate (10) by heating under pressure a plurality of fiber-reinforced thermoplastic resin sheets (12) that are laid on a plane, and thereby integrating the fiber-reinforced thermoplastic resin sheets into one resin composite plate, the fiber-reinforced thermoplastic resin sheets each containing fibers (F) arranged in one direction, a joint surface (30a) between the adjacent fiber-reinforced thermoplastic resin sheets (12) is in the form of a curved surface, plural surfaces or a combination of a curved surface and a plane.

With this structure, in comparison with a case that the joint surface (30a) is in the form of one plane, it is possible to enlarge the area of the joint surface (30a) and hence, to prevent the resin composite plate (10) from breaking at the joint portion (30) between the fiber-reinforced thermoplastic resin sheets (12).

Incidentally, a three-dimensional formed article may be manufactured by heating under pressure one or plural manufactured resin composite plates (10) stacked together, with the one or plural resin composite plates (10) being sandwiched or clamped between the dies.

While the invention has been particularly shown and described with reference to the preferred embodiments, it will be understood that variations and modifications can be effected thereto by those skilled in the art without departing from the scope of the invention as defined by the appended claims.

What is claimed is:

1. A method of manufacturing a resin composite plate having a predetermined thickness, the method comprising:
    producing a plurality of resin sheet groups, wherein each of the plurality of resin sheet groups is produced by stacking at least
        (1) a first fiber-reinforced thermoplastic resin sheet having a first thickness on
        (2) a second fiber-reinforced thermoplastic resin sheet having a second thickness which is different from the first thickness,
        each of the first and second fiber-reinforced thermoplastic resin sheets containing fibers arranged in one direction;
    laying the plurality of resin sheet groups side-by-side on a plane; and
    manufacturing the resin composite plate having the predetermined thickness by heating, under pressure, the plurality of resin sheet groups that are laid side-by-side on the plane, to integrate the plurality of resin sheet groups into said resin composite plate, wherein
    at least one resin sheet group among the plurality of resin sheet groups laid on the plane requires strength and differs from another resin sheet group not requiring strength among the plurality of resin sheet groups laid on the plane in a number of fiber-reinforced thermoplastic resin sheets that are stacked, so as to increase the strength of said at least one resin sheet group and to weaken the strength of said another resin sheet group.

2. The method according to claim 1, wherein:
the producing of each of the plurality of resin sheet groups comprises stacking the first fiber-reinforced thermoplastic resin sheet with the fibers thereof being oriented in a first fiber direction on the second fiber-reinforced thermoplastic resin sheet with the fibers thereof being oriented in a second fiber direction so as to cross the first fiber direction of the first fiber-reinforced thermoplastic resin sheet with the second fiber direction of the second fiber-reinforced thermoplastic resin sheet.

3. The method according to claim 2, wherein:
in the producing of each of the plurality of resin sheet groups, the first fiber-reinforced thermoplastic resin sheet is adjacently-stacked on the second fiber-reinforced thermoplastic resin sheet.

4. The method according to claim 1, wherein:
in each of the plurality of resin sheet groups, the first fiber-reinforced thermoplastic resin sheet differs in volume fraction of fiber from the second fiber-reinforced thermoplastic resin sheet.

5. The method according to claim 1, wherein:
at least one of the plurality of resin sheet groups laid on the plane differs from another of the plurality of resin sheet groups laid on the plane in thickness.

6. The method according to claim 1, wherein:
a joint surface between adjacent resin sheet groups among the plurality of resin sheet groups laid on the plane is in a form of (i) a curved surface, (ii) plural planes, or (iii) a combination of a curved surface and a plane.

7. The method according to claim 1, wherein:
the plurality of resin sheet groups laid on the plane each have a polygonal shape.

8. The method according to claim 1, wherein:
at least one of the plurality of resin sheet groups laid on the plane differs from another of the plurality of resin sheet groups laid on the plane in content of fiber.

9. The method according to claim 1, wherein:
at least one of the plurality of resin sheet groups laid on the plane differs from another of the plurality of resin sheet groups laid on the plane in volume fraction of fiber.

10. A method of manufacturing a resin composite plate, the method comprising:
    laying a plurality of fiber-reinforced thermoplastic resin sheet groups having different thicknesses side-by-side on a plane, each of the plurality of fiber-reinforced thermoplastic resin sheet groups containing fibers arranged in one direction, wherein:
        a joint surface between adjacent fiber-reinforced thermoplastic resin sheet groups among the plurality of fiber-reinforced thermoplastic resin sheets laid on the plane is in a form of (i) a curved surface, (ii) plural planes, or (iii) a combination of a curved surface and a plane; and
    manufacturing the resin composite plate by heating, under pressure, the plurality of fiber-reinforced thermoplastic resin sheet groups that are laid side-by-side on the plane, to integrate the plurality of fiber-reinforced thermoplastic resin sheet groups into said resin composite plate, wherein at least one resin sheet group among the plurality of resin sheet groups laid on the plane requires strength and differs from another resin sheet group not requiring strength among the plurality of resin sheet groups laid on the plane in a number of fiber-reinforced thermoplastic resin sheets that are stacked, so as to increase the strength of said at least one resin sheet group and to weaken the strength of said another resin sheet group.

11. A method of manufacturing a three-dimensional formed article, the method comprising:

manufacturing a plurality of resin composite plates each having a predetermined thickness, wherein each of the plurality of resin composite plates is manufactured by producing a plurality of resin sheet groups, wherein each of the plurality of resin sheet groups is produced by stacking at least (1) a first fiber-reinforced thermoplastic resin sheet having a first thickness on (2) a second fiber-reinforced thermoplastic resin sheet having a second thickness which is different from the first thickness, each of the first and second fiber-reinforced thermoplastic resin sheets containing fibers arranged in one direction;

laying the plurality of resin sheet groups side-by-side on a plane; and manufacturing each of said resin composite plates having the predetermined thickness by heating, under pressure, the plurality of resin sheet groups that are laid side-by-side on the plane, to integrate the plurality of resin sheet groups into a respective one of said resin composite plates; and manufacturing the article by heating, under pressure, at least one resin composite plate of the plurality of resin composite plates stacked together, with the at least one resin composite plate being clamped between dies, wherein the at least one resin composite plate (i) is one resin composite plate of the plurality of resin composite plates, or (ii) includes several resin composite plates of the plurality of resin composite plates stacked together, and in manufacturing the at least one resin composite plate, at least one resin sheet group among the plurality of resin sheet groups laid on the plane requires strength and differs from another resin sheet group not requiring strength among the plurality of resin sheet groups laid on the plane in a number of fiber-reinforced thermoplastic resin sheets that are stacked, so as to increase the strength of said at least one resin sheet group and to weaken the strength of said another resin sheet group.

12. The method according to claim 11, wherein:

in manufacturing the at least one resin composite plate, at least one resin sheet group of the plurality of resin sheet groups laid on the plane differs from another of the plurality of resin sheet groups laid on the plane in at least one of thickness and content of fiber.

13. The method according to claim 11, wherein:

in manufacturing the at least one resin composite plate, at least one resin sheet group of the plurality of resin sheet groups laid on the plane differs from another of the plurality of resin sheet groups laid on the plane in thickness, content of fiber, or volume fraction of fiber.

* * * * *